United States Patent
Yano

(10) Patent No.: US 7,471,847 B2
(45) Date of Patent: Dec. 30, 2008

(54) IMAGE PROCESSING METHOD AND APPARATUS FOR CORRECTING IMAGE BRIGHTNESS DISTRIBUTION

(75) Inventor: Kotaro Yano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 728 days.

(21) Appl. No.: 10/887,813

(22) Filed: Jul. 12, 2004

(65) Prior Publication Data

US 2005/0012831 A1    Jan. 20, 2005

(30) Foreign Application Priority Data

Jul. 18, 2003    (JP) .............................. 2003-199125

(51) Int. Cl.
*G06K 9/40* (2006.01)
(52) U.S. Cl. .................. 382/274; 382/260; 382/275; 358/3.26; 358/3.27
(58) Field of Classification Search ................ 382/260, 382/274, 275; 358/3.26, 3.27, 518, 520
See application file for complete search history.

(56) References Cited

U.S. PATENT DOCUMENTS

| | | | | |
|---|---|---|---|---|
| 4,823,200 A | * | 4/1989 | Tsunekawa et al. | 386/118 |
| 5,367,381 A | * | 11/1994 | Curry | 358/3.07 |
| 5,430,472 A | * | 7/1995 | Curry | 347/232 |
| 5,712,474 A | * | 1/1998 | Naneda | 250/208.1 |
| 5,737,075 A | * | 4/1998 | Koch et al. | 356/310 |
| 6,081,345 A | * | 6/2000 | Curry | 358/3.28 |
| 6,239,886 B1 | * | 5/2001 | Klassen et al. | 358/518 |
| 6,366,317 B1 | * | 4/2002 | Mattison et al. | 348/241 |
| 6,427,020 B1 | * | 7/2002 | Rhoads | 382/100 |
| 6,487,321 B1 | * | 11/2002 | Edgar et al. | 382/260 |
| 6,507,358 B1 | | 1/2003 | Mori et al. | 348/42 |
| 6,546,132 B1 | * | 4/2003 | Bhattacharjya et al. | 382/167 |

(Continued)

FOREIGN PATENT DOCUMENTS

JP    10-13624    1/1998

(Continued)

OTHER PUBLICATIONS

Jobson, et al., "A Multiscale Retinex for Bridging the Gap Between Color Images and the Human Observation of Scenes", IEEE Transaction on Image Processing, vol. 6, No. 7, pp. 965-976 (Jul. 1997).

(Continued)

*Primary Examiner*—Yosef Kassa
(74) *Attorney, Agent, or Firm*—Fitzpatrick, Cella, Harper & Scinto

(57) ABSTRACT

An image processing apparatus comprises a luminance extraction means for extracting a luminance component from image data, a scale conversion means for obtaining a distribution of the luminance component on a relatively large scale, a luminance improvement means for improving the luminance distribution of the image data by using the luminance component and an output from the scale conversion means, and an image reproduction means for reproducing the image data by using an output from the luminance improvement means as a luminance distribution of a new image, wherein the luminance improvement means further comprises a parameter adjustment means for adjusting a degree of improvement by means of a parameter. Thus, a brightness distribution is optimally improved according to image quality of a digital image to be processed.

17 Claims, 2 Drawing Sheets

U.S. PATENT DOCUMENTS

| | | | |
|---|---|---|---|
| 6,571,000 B1 * | 5/2003 | Rasmussen et al. | 382/112 |
| 6,590,194 B2 * | 7/2003 | Sardana et al. | 250/208.1 |
| 6,711,302 B1 * | 3/2004 | Lee | 382/275 |
| 6,965,416 B2 | 11/2005 | Tsuchiya et al. | 348/606 |
| 7,065,257 B2 * | 6/2006 | Soga et al. | 382/274 |
| 2003/0052979 A1 | 3/2003 | Soga et al. | 348/241 |
| 2003/0067620 A1 | 4/2003 | Masumoto et al. | 358/1.13 |
| 2003/0067638 A1 | 4/2003 | Yano | 358/540 |
| 2003/0156196 A1 | 8/2003 | Kato et al. | 348/207.2 |
| 2004/0046990 A1 | 3/2004 | Yano et al. | 358/1.15 |

FOREIGN PATENT DOCUMENTS

| | | |
|---|---|---|
| JP | 11-191871 | 7/1999 |
| JP | 11-195047 | 7/1999 |
| JP | 2001-222710 | 8/2001 |
| JP | 2001275015 | 10/2001 |

OTHER PUBLICATIONS

Reinhard, et al., "Photographic Tone Reproduction for Digital Images", acm Transactions on Graphics, vol. 21, No. 3, (Jul. 2002).

Moroney, "Local Color Correction Using Non-Linear Masking", IS&T/SID Eighth Color Image Conference, pp. 108-111.

Chinese Office Action for Application No. 2004100697750 dated Oct. 19, 2007.

Partial English translation of JP 2001-222710 published Aug. 17, 2001.

* cited by examiner

US 7,471,847 B2

IMAGE PROCESSING METHOD AND APPARATUS FOR CORRECTING IMAGE BRIGHTNESS DISTRIBUTION

This application claims priority from Japanese Patent Application No. 2003-199125 filed Jul. 18, 2003, which is hereby incorporated by reference.

BACKGROUND OF THE INVENTION

1. Field of the Invention

The present invention relates to image processing method and apparatus which correct a distribution of brightness of an image by an image process.

2. Related Background Art

Conventionally, as a method of taking a photograph of appropriate brightness, a method of measuring average luminance of a scene to be taken or photographed and then controlling shutter speed, a aperture value and the like based on the measured average luminance is known. Moreover, an exposure control method based on so-called evaluation photometry.,that a scene is first divided into predetermined areas, luminance of each of the divided areas is measured, the measured luminance is appropriately weighted with respect to each area, average luminance is then obtained based on the weighted values, and appropriate exposure is thus obtained with respect to the entire scene is known.

Incidentally, in a scene taken against light (also called a backlight scene) that the brightness of a main subject is remarkably dark as compared with that of its background, the main subject portion on a taken or photographed image is inevitably dark. Therefore, to take a photograph in which appropriate brightness can be secured even in case of a backlight scene, it is necessary at the moment of taking the photograph to preset exposure of a camera so that the subject is taken brightly as compared with a case of taking an average photograph. However, such an exposure correction operation is troublesome for a user, and moreover skill is required to appropriately set the exposure of the camera. Besides, even if the exposure correction is appropriately performed with respect to the main subject, the background portion of the main subject adversely tends to become bright excessively.

In analog photographing technique, print of appropriate brightness can be obtained by performing so-called a dodging process in a darkroom. Therefore, it is desirable even in a digital image process to easily achieve a dodging process similar to that in the analog photographing technique.

For example, a method of achieving the dodging process in the digital image process is proposed by Daniel J. Jobson et al. in "A Multiscale Retinex for Bridging the Gap Between Color Images and the Human Observation of Scenes", IEEE TRANSACTIONS ON IMAGE PROCESSING, VOL. 6, NO. 7, JULY 1997 (hereinafter called a prior art 1). In this method, a difference process between a component obtained by logarithmic transforming a digital image and a low-frequency component of the logarithmic-transformed component is performed to darken a bright component and brighten a dark component in a low-frequency area in the digital image, thereby achieving image improvement.

Besides, another method of achieving the dodging process in the digital image process is proposed by Reinhard et al. in "Photographic Tone Reproduction for Digital Images", acm Transactions on Graphics, JULY 2002, Vol. 21, No. 3 (hereinafter called a prior art 2). In this method, a dodging-like effect is obtained in the digital image process by using a luminance component of a digital image and a low-frequency component thereof.

However, in such conventional methods, when a noise characteristic of the digital image to be processed is deficient, a noise on the image is emphasized by the above image improvement process and thus becomes noticeable if anything. Moreover, when the number of gradations is small, a so-called gradation jump becomes noticeable. Furthermore, when contrast and chroma of the digital image are high, the contrast and the chroma are excessively emphasized by the above image improvement process, whereby a satisfactory image cannot be obtained.

SUMMARY OF THE INVENTION

An object of the present invention is to solve conventional problems as described above, and to provide an image processing system which can optimally improve a distribution of brightness according to an image quality of a digital image to be processed.

In order to achieve the above object, the present invention as recited in Claim 1 is characterized by an image processing method which comprises the steps of: extracting a low-frequency brightness component from image data representing an image; detecting a feature amount of a brightness component in the image; setting a parameter based on the feature amount; and correcting the brightness component of the image data by using the low-frequency brightness component and the parameter.

Further, the present invention as recited in Claim 8 is characterized by an image processing method which comprises the steps of: extracting a low-frequency brightness component from image data representing an image; setting a parameter based on photographing data of the image; and correcting a brightness component of the image data by using the low-frequency brightness component and the parameter.

Other objects and features of the present invention will be apparent from the following description in conjunction with the accompanying drawings.

DETAILED DESCRIPTION OF THE PREFERRED EMBODIMENT

Figure 1:
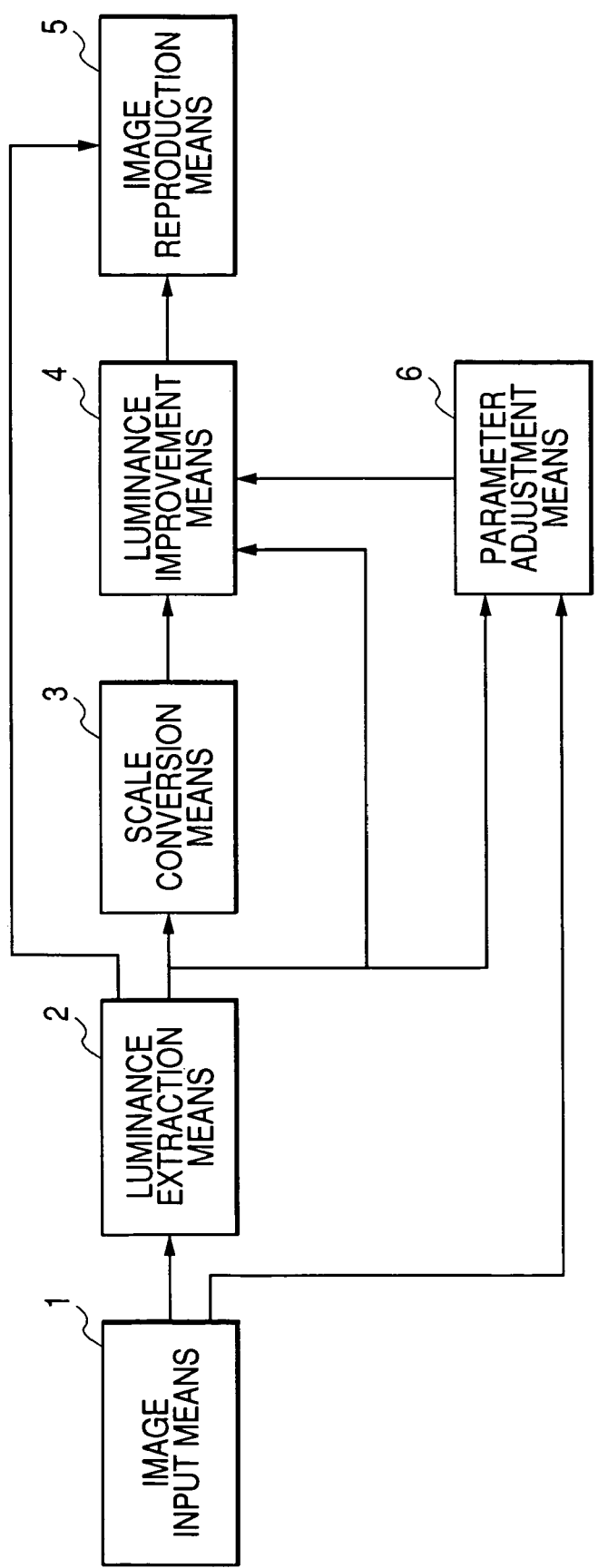
FIG. 1 is a view showing the structure of the embodiment in an image processing system according to the present invention.

FIG. 1 shows the structure of the embodiment in an image processing system according to the present embodiment.

In FIG. 1, reference numeral 1 denotes an image input means for inputting digital image data (hereinafter, called image data) and photographing data at a time of photographing an image into the image processing system. For example, such the input means is constituted in a digital camera.

Reference numeral 2 denotes a luminance extraction means for extracting luminance components and color components from the image data which was input by the image input means 1.

Reference numeral 3 denotes a scale conversion means for obtaining the distribution on a relatively large scale, of the luminance component of the image data which was output from the luminance extraction means 2.

Reference numeral 4 denotes a luminance improvement means for improving the distribution of the luminance components of the image data by use of the luminance component of the image data which was output from the luminance extraction means 2 and the distribution, on a relatively large scale, of the luminance component which was output from the scale conversion means 3.

Reference numeral 5 denotes an image reproduction means for reconstituting the image data by synthesizing the improved luminance component which was output from the luminance improvement means 4 with the color component which was output from the luminance extraction means 2.

Reference numeral 6 denotes a parameter adjustment means for adjusting parameters so as to maintain a degree of improvement to be processed in the luminance improvement means 4 in the optimum condition from the luminance component of the image data which was output -from the luminance extraction means 2 in accordance with the image data.

An operation of the above-structured image processing system can be performed by an application program functioning on a general-purpose computer. Hereinafter, in the present application, the image processing system of which the operation is mainly performed by the application program will be explained, and the constitution in the image processing system shown in FIG. 1 will be complementarily explained.

Figure 2:
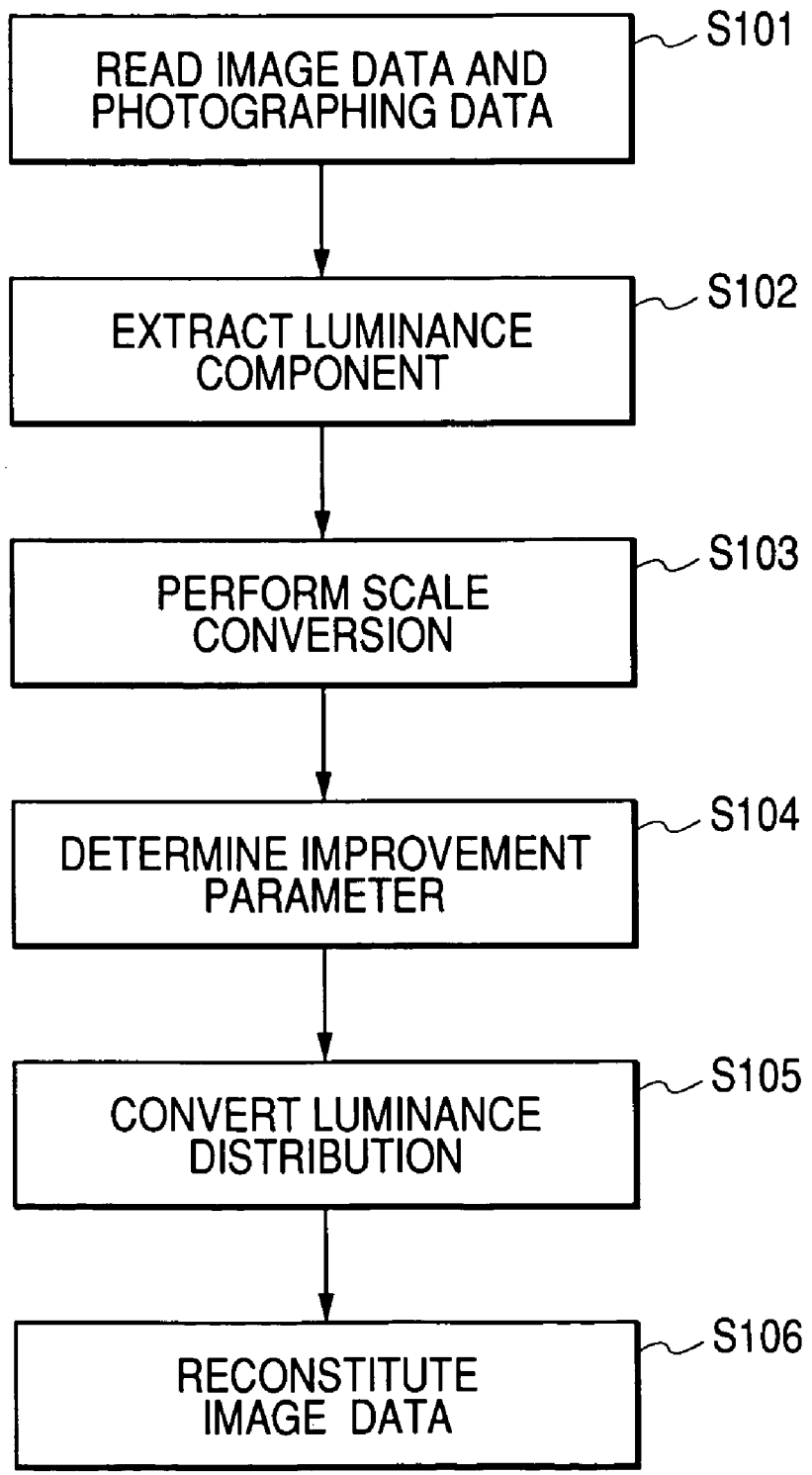
FIG. 2 is a view showing algorithm of an application program in the image processing system according to the present invention.

FIG. 2 shows algorithm of the application program by which the operation of the image processing system in the present embodiment is performed on the general-purpose computer.

First, when the application program is activated, a user inputs a file name of the image data, and the image data and the photographing data are read to be stored in a storage unit in the computer (step S101).

The image data which was read corresponds to a two-dimensional arrangement of M×N pixels (here, symbol M denotes horizontal pixels number and symbol N denotes vertical pixels number) composed of, for example, eight-bit pixels, and the image data is composed of three planes of R, G and B components. The image data is assumed to be expressed by the R, G and B components as R(x, y), G(x, y) and B(x, y) (here, (x, y) are integers of representing a pixel position to be maintained within ranges of $1 \leq x \leq M$, $1 \leq y \leq N$). In a case that the image data is compressed by a method such as a JPEG or the like, the image data is expanded in accordance with a predetermined expansion method so as to obtain the image data composed of pixels of the R, G and B components.

The photographing data corresponds to such data which is added to the image data as incidental information when a photographing operation or a recording operation is performed. For example, a photographing date, a focal length of a lens, a aperture value and the like are enumerated.

In the present embodiment, a case of utilizing sensitivity, an exposure time, a photographing scene type, a compression rate, a bit depth, a color space, color saturation enhancement and contrast enhancement as the photographing data will be described later. The sensitivity corresponds to information to be added as an ISO speed rate or a gain control among the photographing data and corresponds to a gain which is set by an image sensor of the digital camera at a time of obtaining image data, and when an image is photographed by setting the sensitivity in high, a noise characteristic of the image data is deteriorated. The exposure time corresponds to information to be added as the exposure time or a shutter speed among the photographing data and corresponds to a time of accumulating electric signals by the image sensor of the digital camera due to the exposure, and if the exposure time becomes long, the noise characteristic of the image data is deteriorated. The photographing scene type corresponds to a mode which is set by a user every scene so as to perform an optimum control every scene for the digital camera, and in a case that the photographing scene type is a night view, since it is controlled to perform a long time exposure, the noise characteristic of the image data is deteriorated. The compression rate corresponds to information to be added as an image compression mode among the photographing data and is used for determining data capacity for a process of compressing the image data before recording the image data obtained by the digital camera into a recording medium. The compression rate may be estimated from the lateral/longitudinal image size of the photographing data and the image data amount. For example, with respect to the compression by the JPEG method, the noise generates due to the compression, and an image, for which the compression rate is set in higher, becomes to be more deteriorated in the noise characteristic of the image data.

The bit depth corresponds to a bit depth of pixels structured in case of recording the image data obtained by the digital camera into the recording medium and corresponds to a gradation number which can be reproduced. Therefore, when the bit depth is more increased, gradation reproducibility of the image data is more improved.

The color space represents a range of colors which can be reproduced in case of recording the image data obtained by the digital camera into the recording medium, and when the color space is more extended, colors of wider range can be distinguished and reproduced with a value of each pixel of R, G and B components of the image data. However, if the color space is large, since steps in quantization for discriminating colors become rough, the gradation reproducibility is deteriorated.

The color saturation enhancement corresponds to an enhancement degree in case of executing a process of emphasizing chroma of the image data obtained by the digital camera, and if the enhancement degree is set in high-level, the chroma of the image data to be recorded into the recording medium is increased.

The contrast enhancement corresponds to the enhancement degree in case of executing a process of emphasizing contrast of the image data obtained by the digital camera, and if the enhancement degree is set in high-level, the contrast of the image data to be recorded into the recording medium is increased.

Next, the luminance component is extracted on the basis of each pixel of the R, G and B components composing the image data (step S102).

With respect to extraction of the luminance component, for example, it is assumed that the pixel components of R, G and B correspond to data in an sRGB color space described in the IEC (International Electro-technical Commission) 61966-2-1, and the data is converted into data of CIE 1931 XYZ by a gamma conversion and a 3×3 matrix operation in accordance with a method described in the IEC 61966-2-1. Here, when the converted data of XYZ are respectively assumed as X(x, y), Y(x, y) and Z(x, y), data of Y(x, y) corresponds to the luminance component to be extracted. When the luminance extraction is organized by the hardware, for example, it can be organized by a table reference circuit (section of gamma conversion) according to a look-up table and a matrix operation circuit.

As a method of extracting the luminance component, the above-mentioned process is simplified, and the luminance component may be extracted only by the matrix operation. Further, a conversion from RGB to YCbCr, RGB to L*a*b* or RGB to HSV may be used.

Next, the distribution of the luminance component on relatively large scale is obtained from the extracted luminance component (step S103).

In order to obtain the distribution of the luminance component on relative large scale (distribution of the low frequency luminance component), for example, a convolution operation with the extracted luminance component and a Gaussian function is performed to supply an output. In order to raise image quality of the improved image data, it is preferable that the convolution operation with the plural Gaussian functions different in the standard deviation is performed to obtain the distribution of the luminance component on plural scales. It should be noted that the above-mentioned process of obtaining the distribution of the luminance component on the large scale is called a scale conversion hereinafter. In case of organizing the scale conversion by the hardware, for example, it can be organized by a convolution operation circuit.

Next, a parameter, which determines a degree of the luminance distribution to be improved from the photographing data and the extracted luminance component, is adjusted (step S104). Since adjustment of the parameter associates with a process of improving the luminance distribution, the details thereof will be described later.

Next, the distribution of the luminance component of the image data is improved using the luminance component of the image data and the distribution of the luminance component to which the scale conversion was performed (step S105).

As an example of a process, according to a method based on the prior art 1, a logarithmic transformation is performed for the luminance component and the distribution of the luminance component to which the scale conversion was performed, and the obtained difference between them is output. Further, the luminance component is defined that a weighted average of a difference output on different scales was improved. However, since the degree of improvement cannot be adjusted in accordance with an image by this method, a logarithmic transformation output of the luminance component, to which the scale conversion was performed, is multiplied by a coefficient. This coefficient corresponds to a parameter of adjusting the degree of improvement. An output of the luminance component which was improved based on the above-explained process is indicated by the following equation (1).

$$Y'(x, y) = \sum_n w_n \{\log Y(x, y) - \gamma \cdot \log[F_n(x, y) * Y(x, y)]\} \quad (1)$$

Here, Y'(x, y), $F_n$(x, y), $w_n$, n and γ are respectively an output of the improved luminance component, a Gaussian function, weight between scales, a parameter for representing the scale and a parameter for representing the degree of improvement. Further, a symbol "*" denotes the convolution operation.

It is understood that the weight between scales can be omitted by adjusting a standard deviation of the scale (replaced to a simple average) and it is preferable to return a luminance unit to an original luminance unit by an inverse transformation (exp. operation) rather than a value of logarithmic transformed is output as in the equation (1) as image quality of the improved image data. Therefore, it is preferable that an output represented by the following equation (2) corresponds to the improved luminance component.

$$Y'(x,y) = \exp<\log Y(x,y) - \gamma \cdot \text{Avg}\{\log[F_n(x,y)*Y(x,y)]\}> \quad (2)$$

Here, the Avg indicates an average value operation. The following equation (3) may be available instead of the equation (2).

$$Y'(x, y) = \frac{Y(x, y)}{[\text{Avg}\{F_n(x, y) * Y(x, y)\}]^\gamma} \quad (3)$$

It should be noted that the average value operation of a scale conversion output on the plural scales is performed by the scale conversion process in the step S103, and an average value of the scale conversion output on the plural scales may be the distribution of the luminance component to which the scale conversion was performed.

In case of organizing this luminance conversion by the hardware, for example, it can be organized by an average value operation circuit, a circuit for forming the look-up table, a table storage unit, the table reference circuit (section of gamma conversion) and a division circuit. The average value operation circuit may be provided in the scale conversion means.

Next, the improved luminance component and the color components X(x, y) and Z(x, y) converted in the step S102 are synthesized to reconstitute the image data (step S106).

Here, initially, the color component is corrected in accordance with the change of the luminance component such that color of the reconstituted image data is not changed as much as possible. For example, the color components X(x, y) and Z(x, y) are respectively multiplied by a ratio between before and after changing the luminance component Y'(x, y)/Y(x, y). Then, the RGB data is obtained from data of X, Y and Z. A process executed in this condition corresponds to an inverse conversion of the process executed in the step S102. Therefore, the 3×3 matrix operation and an inverse gamma conversion process are executed to output data of eight-bit for each of the R, G and B components. In case of organizing the reconstitution of the image data by the hardware, for example, it can be organized by a multiplication/division circuit, the matrix operation circuit and the table reference circuit (section of inverse gamma conversion) depending on the look-up table.

In case of using another method such as a conversion from the RGB into the YCbCr in the step S102 as a method of extracting the luminance component, it is needless to say that a process of the corresponded inverse conversion has to be executed in this process.

Next, an example of a parameter adjusting method in the step S104 will be explained as to a case of performing the luminance conversion by the equation (3) in the step S105.

Initially, the luminance components of the image data are classified into the range of predetermined luminance values to form a luminance histogram. A luminance value (luminance value in this case is assumed as $Y_0$) characterized in that a ratio of frequency of the histogram integrated from the dark component for all the samplings reaches a predetermined ratio is obtained. At this time, a variable γ, by which the obtained luminance value $Y_0$ reaches a predetermined luminance value (luminance value in this case is assumed as $Y_1$, however, $Y_0 \leq Y_1$), is defined as a parameter of representing the degree of improvement. Supposing that an operating result within [ ] described in a denominator in the equation (3)

is nearly equal to Y(x, y), the parameter γ can be obtained by the following equation (4).

$$\gamma = 1 - \frac{\log Y_1}{\log Y_0} \quad (4)$$

Further, the obtained γ is compared with a predetermined threshold according to the photographing data, and if the γ exceeds the threshold, the threshold is to be adopted as a parameter γ.

For example, in case of using the sensitivity as the photographing data, a threshold corresponding to the sensitivity of the image data photographed by the digital camera, which is equal to or less than a level of ISO100 is defined as γ0, a threshold corresponding to the sensitivity which is equal to or less than a level of IS0200 is defined as γ1 and a threshold corresponding to the sensitivity which exceeds the level of IS0200 is defined as γ2 (however, 0<γ2<γ1<γ0<1). According to this process, it is suppressed that the noise is emphasized by suppressing a degree of the luminance distribution improvement for an original image deteriorated in a noise characteristic. Even if a case of the same sensitivity, since the noise characteristic differs due to the digital camera for photographing an image, it is more preferable that the thresholds are respectively set in a combination with a model name of the digital camera and the sensitivity as the photographing data.

In case of using the exposure time as the photographing data, when the exposure time in photographing an image by the digital camera is equal to or larger than a predetermined value, a small threshold is set. According this process, it is suppressed that the noise is emphasized by suppressing the degree of the luminance distribution improvement for the original image deteriorated in the noise characteristic. Similarly, in a case that the capturing scene type is a nightscene, since it is expected to cope with a long time exposure, a small threshold is set. Since the correction of a scene against the sunbeam is usually required for a case that a person is in a scene against the sunbeam, when the capturing scene type is set in an automatic or set in a scene of not including person, it is judged that the improvement of luminance is not necessary, and the threshold is set as 0, that is, a luminance improvement process using an output of the scale conversion means may not be executed. In case of using the compression rate as the photographing data, a smaller threshold is set for image data in the higher compression rate when the image is photographed by the digital camera to record the obtained image data into the recording medium. Similar to a case of the sensitivity, it is suppressed that the noise is emphasized by suppressing the degree of the luminance distribution improvement for the original image deteriorated in the noise characteristic. In case of using the bit depth as the photographing data, a larger threshold is set for image data in the larger bit depth. It is suppressed to generate a gradation jump by suppressing the degree of the luminance distribution improvement for an original image deteriorated in the gradation reproducibility. In case of using the color space as the photographing data, a smaller threshold is set for image data in the larger color space. Similar to a case of the bit depth, it is suppressed to generate the gradation jump by suppressing the degree of the luminance distribution improvement for the original image deteriorated in the gradation reproducibility. In case of using the color saturation enhancement as the photographing data, a smaller threshold is set for image data in the more intensive degree of the color saturation enhancement. It is suppressed to deteriorate image quality, of which the chroma is further emphasized, by suppressing the degree of the luminance distribution improvement for an original image of which the chroma is emphasized. In case of using the contrast enhancement as the photographing data, a smaller threshold is set for image data in the more intensive degree of the contrast enhancement. It is suppressed to deteriorate image quality, of which the contrast is further emphasized, by suppressing the degree of the luminance distribution improvement for an original image of which the contrast is emphasized.

In the foregoing parameter adjustment, it is needless to say that if the parameter is adjusted by combining plural photographing data, the more effective result can be obtained.

As an example of using the photographing data for the adjustment of the parameter, although the threshold of the parameter γ was to be set in accordance with a value of the each photographing data, another method may be used if it is a method of suppressing side effects such as the noise enhancement and the like in the luminance distribution improvement. For example, in case of using the sensitivity as the photographing data, a method of obtaining the parameter γ by the following equation (5) instead of the equation (4) is considered.

$$\gamma = k \cdot \left(1 - \frac{\log Y_1}{\log Y_0}\right) \quad (5)$$

However, a constant k changes according to a value of the sensitivity, and the constant k becomes smaller for the higher sensitivity.

In the present embodiment, although the parameter is to be automatically adjusted on the basis of the photographing data and the luminance component of the image data, the parameter may be automatically adjusted on the basis of the photographing data and pixel values of the RGB in the image data.

In the foregoing example, a method of improving the distribution of brightness in the optimum condition in accordance with the image data to be processed on the basis of the prior art 1, however in the following example, a method of improving the distribution of brightness in the optimum condition in accordance with image data to be processed on the basis of the prior art 2 will be explained. Since difference between the above-mentioned embodiment and the following example is mainly in a process of improving the distribution of the luminance component of the image data to be executed in the step S105, a part thereof will be mainly explained.

According to the prior art 2, the degree of generating a halo after performing the luminance conversion by using the luminance components on different scales is evaluated, and the most suitable scale is determined such that the deterioration in the image quality due to generation of the halo does not occur and then the luminance conversion is to be performed. A case of applying this example to such the process will be indicated in the following equation (6).

$$Y'(x, y) = \frac{a \cdot Y(x, y)}{1 + e \cdot V(x, y)} \quad (6)$$

Here, the V (x, y) denotes a luminance component selected from the luminance components to which the plural scale conversions were performed, a symbol a denotes a parameter of adjusting intensity of the luminance component, and a symbol e denotes a parameter of indicating the degree of improvement of the luminance component. It is needless to say that an adjustment method of an improvement parameter in the step S104 has to be changed in accordance with the change of an adjustment method in the luminance component improvement process.

In the example explained based on the prior art 2, although the luminance component itself of an image is to be adjusted together with the degree of improvement of the luminance component, it is needless to say that the present invention may be combined with a process of adjusting the luminance component itself of the image.

In the process in the step S105, as a value within [ ] described in a denominator in the equation (3), Bilateral Filtering as shown in "Fast Bilateral Filtering for the Display of High-Dynamic-Range Images", acm Transactions on Graphics, JULY 2002, Vol.21, No.3 reported by Durand et al. may be applied to the luminance component. In this case, the Bilateral Filtering process is previously executed to the luminance component in the scale conversion process to be executed in the step S103.

In the above-mentioned embodiment, although the process was executed to XYZ signals, the process may be executed to other color signals such as Luv and the like. In this case, as a signal to be processed, an L signal is to be used instead of a luminance component Y. That is, the above-mentioned embodiment can be applied to not only a luminance signal but also a signal indicating the brightness.

A process, which was executed in a case where the program codes of software for realizing the functions of the above-mentioned embodiments are supplied to a computer in an apparatus or a system connected to various devices so as to realize the functions of the above-mentioned embodiments and operate the various devices and then the computer (CPU or MPU),in the system or the apparatus functions in accordance with the stored programs to operate the various devices, is also included in a category of the present invention.

In this case, the program codes themselves of the software realize the functions of the above-mentioned embodiments, and the program codes themselves and a means for supplying the program codes to the computer, for example, a storage medium storing such the program codes constitute the present invention.

As the storage medium for storing the program codes, for example, a floppy disk, a hard disk, an optical disk, a magnetooptical disk, a CD-ROM, a magnetic tape, a non-volatile memory card, a ROM or the like can be used.

It is needless to say that the embodiments of the present invention include such the program codes not only in a case where the functions of the above-mentioned embodiments are realized by executing the supplied program codes by the computer, but also in a case where the functions of the above-mentioned embodiments are realized by executing the program codes cooperating with an OS (operating system) functioning on the computer or another application software or the like.

Further, it is needless to say that the present invention includes a case where the supplied program codes are once stored in a memory provided in a function expansion board inserted in the computer or a function expansion unit connected to the computer, then a CPU or the like provided in the function expansion board or the function expansion unit executes all the process or a part thereof according to the instructions of such the program codes, thereby realizing the functions of the above-mentioned embodiments by such the process.

As described above, the present invention has been explained on the basis of the preferable embodiments. However, the present invention is not limited to the above-mentioned embodiments, but may be modified in various manners within the scope of the following claims.

What is claimed is:

1. An image processing method comprising the steps of:
   extracting a low-frequency brightness component from image data representing an image;
   detecting a feature amount calculated based on brightness components of plural pixels included in the image;
   setting a parameter based on the feature amount; and
   correcting the low-frequency brightness component by using the set parameter as an index number and correcting the brightness component of the image data based on the corrected low-frequency brightness component.

2. An image processing method according to claim 1, further comprising the step of reconstituting the image data according to the corrected brightness component.

3. An image processing method according to claim 1, wherein the feature amount is a statistic of the low-frequency brightness component in the image.

4. An image processing method according to claim 1, wherein the parameter is set according to the feature amount and photographing data of the image.

5. An image processing method comprising the steps of:
   inputting image data representing an image and photographing data of the image;
   extracting a low-frequency brightness component from the image data representing the image;
   setting a parameter based on the photographing data of the image; and
   correcting the low frequency brightness component by using the set parameter as an index number and correcting a brightness component of the image data based on the corrected low-frequency brightness component.

6. An image processing method according to claim 5, wherein the photographing data represents sensitivity in image photographing, and the parameter is set so that a degree of a dodging process becomes small as the sensitivity becomes high.

7. An image processing method according to claim 5, wherein the photographing data represents a compression rate, and the parameter is set so that a degree of a dodging process becomes small as the compression rate becomes high.

8. An image processing method according to claim 5, wherein the photographing data represents the number of bits, and the parameter is set so that a degree of a dodging process becomes large as the number of bits becomes large.

9. An image processing method according to claim 5, wherein the photographing data represents a color space, and the parameter is set so that a degree of a dodging process becomes small as a range of the color space becomes wide.

10. An image processing method according to claim 5, wherein the photographing data represents color saturation enhancement, and the parameter is set so that a degree of a dodging process becomes small as a degree of the color saturation enhancement becomes high.

11. An image processing method according to claim 5, wherein the photographing data represents contrast, and the parameter is set so that a degree of a dodging process becomes small as a degree of the contrast becomes high.

12. An image processing method according to claim 5, wherein the photographing data represents an exposure time, and the parameter is set so that a degree of the collection of the brightness component becomes small as the exposure time becomes long.

13. An image processing method according to claim 5, wherein the photographing data represents a capturing scene type, and the correction of the brightness component is to set the parameter according to the photographing scene type.

14. A storage medium storing a computer readable program for causing a computer to achieve an image processing method comprising the steps of:

extracting a low-frequency brightness component from image data representing an image;

detecting a feature amount calculated based on brightness components of plural pixels included in the image;

setting a parameter based on the feature amount; and correcting the low-frequency brightness component by using the set parameter as an index number and correcting the brightness component of the image data based on the corrected low-frequency brightness component.

15. A storage medium storing a computer readable program for causing a computer to achieve an image processing method comprising the steps of:

inputting image data representing an image and photographing data of the image;

extracting a low-frequency brightness component from the image data representing the image;

setting a parameter based on the photographing data of the image; and correcting the low-frequency brightness component by using the set parameter as an index number and correcting a brightness component of the image data based on the corrected low-frequency brightness component.

16. An image processing apparatus comprising:

an extraction unit adapted to extract a low-frequency brightness component from image data representing an image;

a detection unit adapted to detect a feature amount calculated based on brightness components of plural pixels included in the image;

a setting unit adapted to set a parameter based on the feature amount; and a correction unit adapted to correct the low-frequency brightness component by using the set parameter as an index number and correcting the brightness component of the image data based on the corrected low-frequency brightness component.

17. An image processing apparatus comprising:

inputting image data representing an image and photographing data of the image;

an extraction unit adapted to extract a low-frequency brightness component from the image data representing the image;

a setting unit adapted to set a parameter based on the photographing data of the image; and a correction unit adapted to correct the low-frequency brightness component by using the set parameter as an index number and correcting a brightness component of the image data based on the collected low-frequency brightness component.

* * * * *